(12) United States Patent
Bahador

(10) Patent No.: US 10,323,523 B2
(45) Date of Patent: Jun. 18, 2019

(54) BLADE PLATFORM COOLING IN A GAS TURBINE

(71) Applicant: Siemens Aktiengesellschaft, Munich (DE)

(72) Inventor: Mehdi Bahador, Finspång (SE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 15/539,844

(22) PCT Filed: Oct. 23, 2015

(86) PCT No.: PCT/EP2015/074577
§ 371 (c)(1),
(2) Date: Jun. 26, 2017

(87) PCT Pub. No.: WO2016/110342
PCT Pub. Date: Jul. 14, 2016

(65) Prior Publication Data
US 2017/0370230 A1 Dec. 28, 2017

(30) Foreign Application Priority Data
Jan. 9, 2015 (EP) ..................................... 15150567

(51) Int. Cl.
*F01D 5/18* (2006.01)
*F01D 5/08* (2006.01)
(52) U.S. Cl.
CPC ............. *F01D 5/186* (2013.01); *F01D 5/087* (2013.01); *F05D 2220/32* (2013.01);
(Continued)
(58) Field of Classification Search
CPC ............................ F01D 5/186; F05D 2240/81
See application file for complete search history.

(56) References Cited

U.S. PATENT DOCUMENTS

| 4,672,727 A | 6/1987 | Field | |
| 7,097,424 B2 * | 8/2006 | Cunha | ..................... F01D 5/187 416/97 R |

(Continued)

FOREIGN PATENT DOCUMENTS

| DE | 3326951 A1 | 1/1985 |
| DE | 102011077394 A1 | 12/2012 |

(Continued)

OTHER PUBLICATIONS

EP Search Report dated Jul. 8, 2015, for EP patent application No. 15150567.4.

(Continued)

*Primary Examiner* — Justin D Seabe
*Assistant Examiner* — Juan G Flores
(74) *Attorney, Agent, or Firm* — Beusse Wolter Sanks & Maire

(57) ABSTRACT

A blade for a rotor of a gas turbine has: a root, a platform having a lower surface and an upper surface opposite to the lower surface, a hollow aerofoil, an inner cooling passage inside the hollow aerofoil for channelling a first cooling medium to a first plurality of outlet cooling holes on an external surface of the hollow aerofoil, a channel, separated from the first cooling circuit, extending through the platform for channelling a second cooling medium from at least one opening of the channel to a second plurality of outlet cooling holes provided on the upper surface of the platform. The at least one opening of the channel is provided on the lower surface of the platform in order to receive in operation the second cooling medium from an inner cavity of the rotor.

10 Claims, 4 Drawing Sheets

(52) U.S. Cl.
CPC .. *F05D 2240/303* (2013.01); *F05D 2240/307* (2013.01); *F05D 2240/81* (2013.01); *F05D 2260/202* (2013.01); *Y02T 50/671* (2013.01); *Y02T 50/676* (2013.01)

(56) References Cited

U.S. PATENT DOCUMENTS

| | | | | |
|---|---|---|---|---|
| 8,696,304 | B2* | 4/2014 | Elliot et al. | F01D 5/081 |
| | | | | 415/115 |
| 9,528,377 | B2* | 12/2016 | Fedor et al. | F01D 5/081 |
| 2014/0010666 | A1* | 1/2014 | Hudson | F01D 5/186 |
| | | | | 416/97 R |
| 2015/0036255 | A1 | 2/2015 | Leonhardt et al. | |
| 2015/0152735 | A1* | 6/2015 | Molter | F01D 5/187 |
| | | | | 416/97 R |
| 2016/0108738 | A1* | 4/2016 | Devore et al. | F01D 9/023 |
| | | | | 415/177 |

FOREIGN PATENT DOCUMENTS

| | | |
|---|---|---|
| DE | 102012008484 A1 | 10/2013 |
| DE | 102012217310 A1 | 3/2014 |
| EP | 1574670 A2 | 9/2005 |
| GB | 2244520 A | 12/1991 |
| JP | H09294927 | 11/1997 |
| WO | 2012168112 A1 | 12/2012 |

OTHER PUBLICATIONS

International Search Report dated Feb. 10, 2016, for PCT/EP2015/074577.
IPRP (PCT/IPEA/416 and 409) dated Apr. 5, 2017, for PCT/EP2015/074577.

* cited by examiner

BLADE PLATFORM COOLING IN A GAS TURBINE

CROSS REFERENCE TO RELATED APPLICATIONS

This application is the US National Stage of International Application No. PCT/EP2015/074577 filed Oct. 23, 2015, and claims the benefit thereof. The International Application claims the benefit of European Application No. EP15150567 filed Jan. 9, 2015. All of the applications are incorporated by reference herein in their entirety.

FIELD OF INVENTION

The present invention relates to a system for cooling blades, in particular for cooling the platforms of rotor blades in a gas turbine.

ART BACKGROUND

In a gas turbine engine, air is pressurized in a compressor and mixed with fuel in a combustor for generating hot combustion gases. The hot gases are then channelled towards a gas turbine which transforms the energy from the hot gases into work for powering the compressor and other devices which converts power, for example an upstream fan in a typical aircraft turbofan engine application, or a generator in power generation application.

The gas turbine stages include stationary vanes which channel the combustion gases into a corresponding row of rotor blades extending radially outwardly from a supporting rotor disk. Each rotor blade typically comprises a lower root, for coupling the blade with the turbine rotor, and a hollow aerofoil exposed to the combustion gases channelled through the vanes. Aerofoils may be designed and manufactured hollow in order to save weight, to change its eigenfrequency or to include a cooling circuit therein. In the latter case, the cooling gas which circulates inside the cooling circuits is typically bleed air from the compressor discharge. Between the root and the hollow aerofoil, each rotor blade typically further comprises a platform, having an upper surface from which the aerofoil extends. The upper surface of the platform is therefore also exposed to the hot combustion gases channelled through the vanes.

Blade platforms at the first stages of a gas turbine are in contact with combustion gases having high temperature, typically higher than 900° C. Usually the blade platform is covered by a thermal barrier coating (TBC) for protecting the blade platform from corrosion. As long as the temperature in the bond coat under the TBC layer is under 920° C., then the TBC layer is stable and blade can be effectively protected from corrosion. However, the need for improvement in turbine efficiency and output power makes the gas temperature at the turbine inlet hotter and hotter. Therefore, known solutions, as providing a TBC layer for coating the platform, cannot be considered any more reliable for preventing corrosion of the blades during all the turbine lifecycle.

Other solutions for the cooling of blade platforms are shown in U.S. Pat. No. 4,672,727, GB 2 244 520 and EP 1 574 670, but cannot yet considered optimal. In U.S. Pat. No. 4,672,727 the platform is could by means of the air trapped in compartments formed between the undersides of the platforms and the rim of the disk. In GB 2 244 520 a design is disclosed for cooling a limited portion of the platform of a blade. In EP 1 574 670 a portion of the air flow channelled to cool the aerofoil of a blade is diverted through a grove provided in the rotor to cool the platform.

It is desirable to provide a new design for gas turbines where the blade platforms are cooled by new and more efficient cooling techniques.

SUMMARY OF THE INVENTION

It may be an object of the present invention to provide a blade for the rotor of a gas turbine including at least a portion of a cooling circuit for efficiently cooling the platform of the blade.

It may be a further object of the present invention to provide a gas turbine including an efficient cooling system for the platforms of the rotor blades, preventing corrosion even when the gas discharging from the combustor reaches temperatures at which a thermal barrier coating applied to the platform is not enough protective.

In order to achieve the objects defined above, a blade for a gas turbine and a gas turbine including such a blade are provided in accordance to the independent claims. The dependent claims describe advantageous developments and modifications of the invention.

According to a first aspect of the present invention, a blade for a rotor of a gas turbine comprises: —a root for connecting the blade to a disc of the rotor, —a platform having a lower surface from which the root extends and an upper surface opposite to the lower surface, —a hollow aerofoil extending from the upper surface of the platform, —an inner cooling passage inside the hollow aerofoil for channelling a first cooling medium to a first plurality of outlet cooling holes provided on at least an external surface of the hollow aerofoil, —at least a channel, separated from the inner cooling passage, extending through the platform for channelling a second cooling medium from at least one opening of the channel to a second plurality of outlet cooling holes provided on the upper surface of the platform, wherein the at least one opening of the channel is provided on the lower surface of the platform in order to receive in operation the second cooling medium from an inner cavity of the rotor.

In gas turbines, the rotor comprises a central portion, close to axis of rotation and an outer portion around the central part, on which rotor blades are mounted. Further, the rotor typically comprises discs, one for each stage of expansion, on the external part of which the blades are attached. In the central portion of the rotor and between discs cavities are present, in which a leakage gas flows. The leakage gas is typically air leaking from the cooling circuit of the blade hollow aerofoils, in particular leaking through the sealing system leaks between the stator and rotor portions of this cooling circuit. This leakage gas then flows in the rotor cavities and is important for ventilation, helping to keep the rotor cavities at a moderate temperature.

Because of the rotation of the rotor, the leakage gas flowing in the rotor cavities, leaks also towards the blades, and in particular towards the blade platforms. According to this invention, by providing a channel through the platform with an opening on the lower surface of the platform, the leakage gas flowing in the rotor cavities can be efficiently used as a cooling medium to cool down the platforms.

According to an exemplary embodiment of the present invention, the openings of the platform cooling channel are oriented towards the root of the blade in order to receive in operation, i.e. when the rotor is rotating, the second cooling medium from the inner cavities of the rotor.

Advantageously, this design allows the leakage gas flowing from the rotor cavities towards the blades aerofoil to enter the cooling passage inside the platform.

According to another exemplary embodiment of the present invention, the cooling channel inside the platform comprises at least a first opening adjacent to a leading border of the platform and a second opening adjacent to a trailing border of the platform.

Advantageously, this design allows the leakage gas flowing from the rotor cavities towards the blades aerofoil to enter the passage inside the platform from both the leading and the trailing borders, i.e. from both the leakage gas flowing upstream and downstream the blade.

According to another exemplary embodiment of the present invention, the lower surface of the platform comprises an upstream seat and a downstream seat for connecting two side plates provided, in the assembled gas turbine, respectively upstream and downstream the root, the first opening and the second opening being respectively provided between the leading border and the upstream seat and between the downstream seat and the trailing border.

Advantageously, this embodiment allows the cooling passage inside the platform to better receive the leakage gas flowing from the rotor cavities towards the blades.

According to another exemplary embodiment of the present invention, the channel in the platform comprises a plurality of fins for channelling the second cooling medium to the second plurality of outlet cooling holes.

Advantageously, this embodiment allows improving both mechanical integrity and cooling of the platform.

According to a second aspect of the present invention, a gas turbine comprises—a rotor including at least: —one disc; —one inner cavity upstream or downstream to the disc; —an outer rotor blade as described above.

The gas turbine in accordance with the present invention allows reaching the same advantages described above with reference to the rotor blade.

BRIEF DESCRIPTION OF THE DRAWINGS

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION

Figure 1:
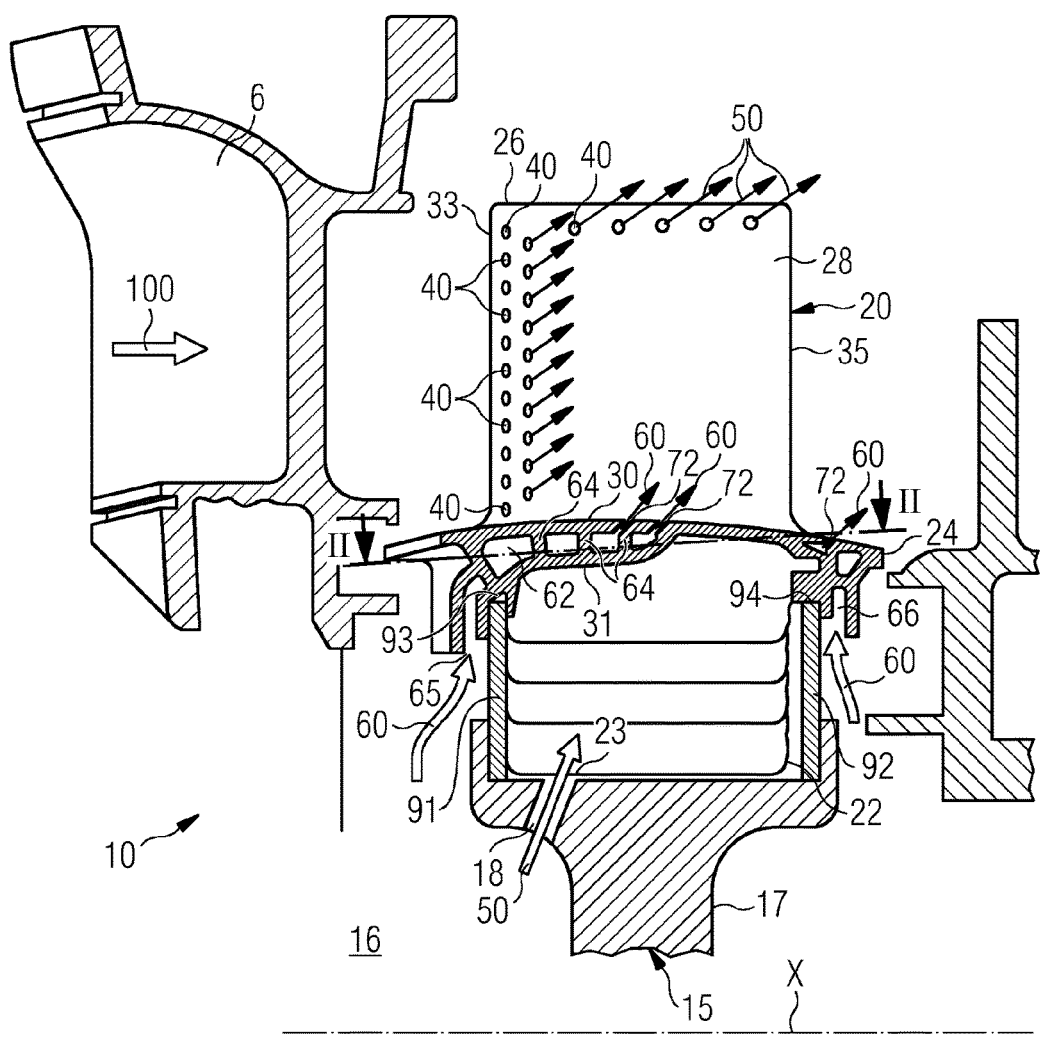
FIG. 1 is a partial longitudinal sectional view of a gas turbine according to the present invention, including a rotor blade according to the present invention.

Hereinafter, above-mentioned and other features of the present invention are described in details. Various embodiments are described with reference to the drawings, wherein the same reference numerals are used to refer to the same elements throughout. The illustrated embodiments are intended to explain, and not to limit the invention.

FIG. 1 shows an example of a gas turbine 10 in a partial sectional view. The gas turbine 10 may be part of a gas turbine (not shown as a whole) which comprises, in flow series, a compressor section, a combustor section and the gas turbine section 10, which are generally arranged in flow series and generally in the direction of a longitudinal or rotational axis X. The gas turbine engine further comprises a shaft which extends longitudinally, which drivingly connects the gas turbine section to the compressor section and which is rotatable about the rotational axis X.

In operation of the gas turbine engine, air is compressed by the compressor section and delivered to the combustion section. The compressed air exiting from the compressor enters the combustion where is mixed with a gaseous or liquid fuel. The air/fuel mixture is then burned and the hot combustion gas or operative gas from the combustion is channelled to the gas turbine section 10, for transforming the energy from the operative gas into working power.

The compressor section and the combustion section are not a specific object of the present invention and, therefore, in the following, only the gas turbine 10 will be described in further detail.

In the following, the terms upstream and downstream refer to the flow direction of the hot operating gas flowing from the combustion section through the gas turbine. The terms axial and radial are made with reference to a rotational axis X of the gas turbine 10.

The gas turbine 10 comprises a stator, a rotor 15 and a plurality of stages. Each stage comprises an upstream stator portion of the stator and a downstream rotor portion of the rotor 15. The present invention apply advantageously, albeit not exclusively to the first stages of the gas turbine 10, where the operative gas is hotter and therefore cooling needs are higher.

FIG. 1 shows the first stage a sectional view of the first stage of the gas turbine 10. The first stage comprises a plurality of guiding vanes 6 (one guiding vane 6 visible in the sectional view of FIG. 1), which are fixed to the stator (not shown in the attached figures) of the gas turbine 10, and a plurality of rotor blades 20 (one rotor blade 20 visible in the sectional view of FIG. 1), which are fixed to an outer portion of the disc 17 of the rotor 15. The rotor 15 includes a plurality of inner cavities 16 extending in the inner portion of the disc 17 (not represented) and between discs, in particular upstream and downstream the disc 17.

The combustion or operative gas (represented by arrow 100) from the combustion chamber enters the stator 5 of the gas turbine 10, flows through the vanes 6, and drives the turbine blades 20 which in turn rotate the rotor 15 around the rotational axis X. The guiding vanes 6 serve to optimise the angle of the operative gas on to the turbine blades 20.

Figure 4:
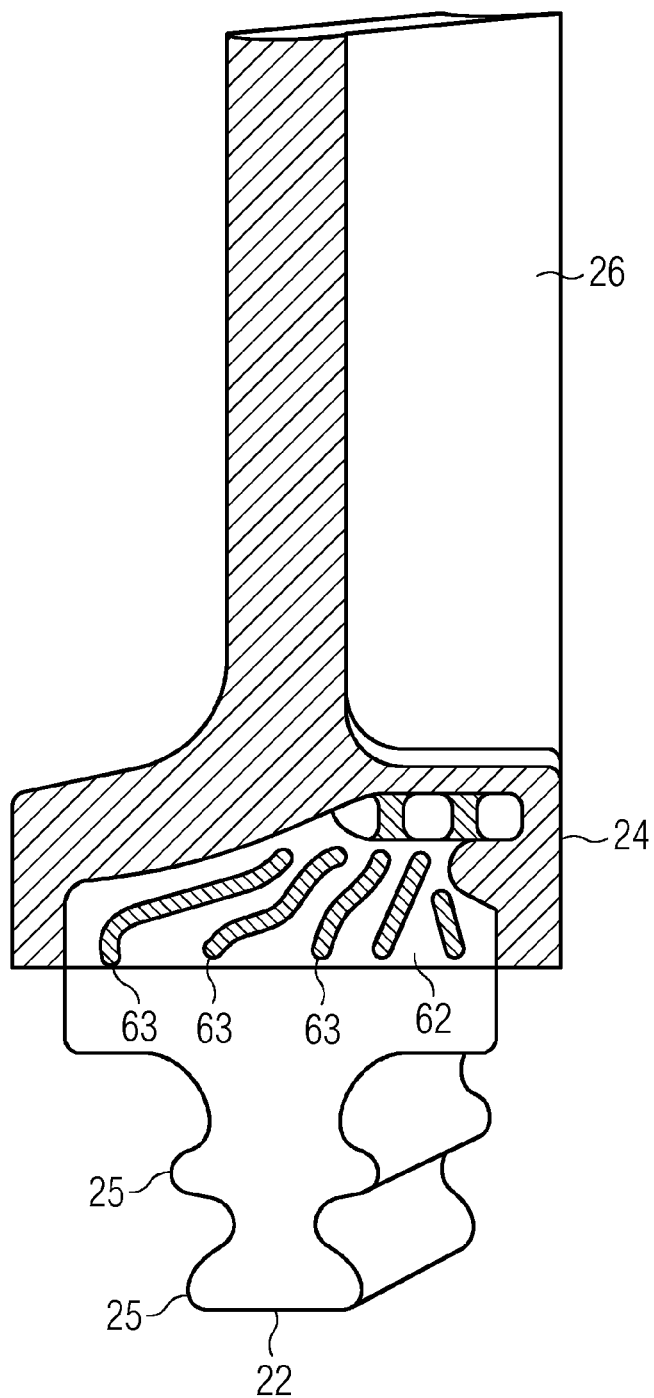
FIG. 4 shows a sectional view of yet another embodiment of a rotor blade according to the present invention, sectioned along a radial direction.

With reference to the sectional views of FIGS. 1 and 4, the rotor blade 20 comprises: —a root 22 for connecting the blade 20 to the disk 17 of the rotor 15, by means of a plurality of serrations 25 engaging correspondent mating serrations (not shown) in the disk 17, —a platform 24 having a lower surface 31, from which the root 22 extends and an upper surface 30 opposite to the lower surface 31, —a hollow aerofoil 26 extending from the upper surface (30) of the platform 24 and having an external surface 28.

When the blade is assembled to the disc 17, side plates 91, 92 are provided, respectively upstream and downstream the root 22, which connects radially the disc 17 to respective upstream seat 93 and downstream seat 94 on the lower surface 31 of the platform 24.

In operation, the external surface 28 of the hollow aerofoil 26 and the upper surface 30 of the platform 24 are exposed to the operative gas 100 and are therefore covered by a thermal barrier coating (TBC) for protecting the hollow aerofoil 26 and platform 24 from corrosion.

Figure 2:
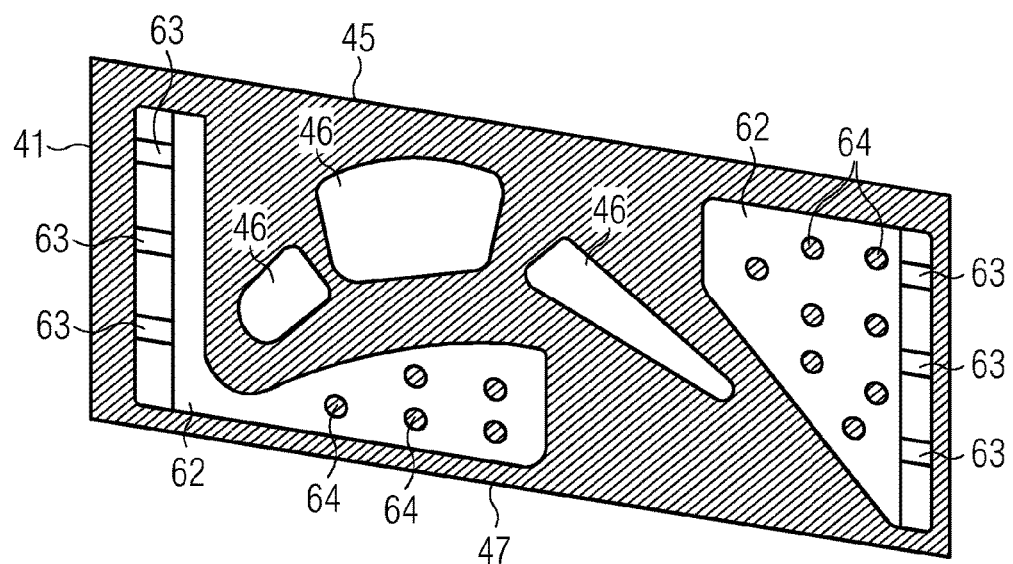
FIG. 2 shows a sectional view of the rotor blade in FIG. 1, sectioned along the section line II-II in FIG. 1.
Figure 3:
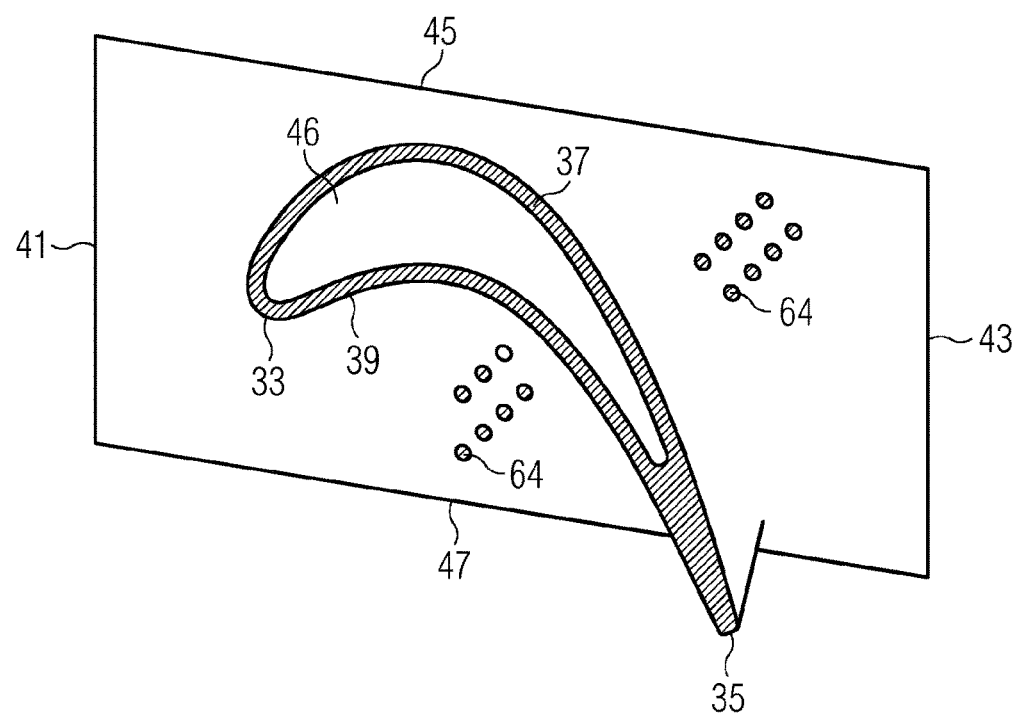
FIG. 3 shows a sectional view of another embodiment of a rotor blade according to the present invention.

With reference to the sectional views of FIGS. 2 and 3, the aerofoil 26 comprises a leading edge 33 at which the flowing operative gas 100 arrive at the aerofoil 26 and a trailing edge 35 at which the combustion gases leave the aerofoil 26.

The external surface 28 is formed by a convex suction side 37 and a less convex, and typically concave, pressure side 39 which is formed opposite to the suction side 37. Both the suction side 37 and the pressure side 39 extend from the leading edge 33 to the trailing edge 35. The platform 24 comprises a perimeter border including: —a leading border 41 upstream the leading edge 33, —a trailing border 43 downstream the trailing edge 35, —a suction border 45 connecting the leading border 41 and the trailing border 43 along the suction side 37 of the aerofoil 26, —a pressure border 47 connecting the leading border 41 and the trailing border 43 along the pressure side 37 of the aerofoil 26.

In operation, the operative gas 100 flows over the platform 24 from leading border 41 to the trailing border 43.

Inside the aerofoil 26 one inner cooling passage 46 (embodiment in FIG. 3) or a plurality of inner cooling passages 46 (embodiment in FIG. 2) are provided for the flowing of a first cooling medium. The cooling passages 46 channel the first cooling medium to a first plurality of outlet cooling holes 40 provided on the leading edge 33, pressure side 39 and suction side 37 of the external surface 28.

The passages 46 inside the hollow aerofoil 26 are part of a first cooling circuit (represented by arrows 50) for cooling the hollow aerofoil 26. The first cooling circuit 50 further comprises a second passage 18 in the disc 17 communicating with the passage inside the hollow aerofoil 26 for channelling the first cooling medium to the first plurality of outlet cooling holes 40. The first cooling medium may be bleed air from the compressor discharge, which flows through the passage 18 in the disc 17, then enters an opening 23 in the root 22, flows through the root 22, the passages 46 and then exits through the outlet cooling holes 40 to form a cooling film over the suction side 37 of the aerofoil 26. The platform 24 is crossed by the first cooling medium along a prevalent radial direction.

The rotor blade 26 further comprises at least one channel 62, 82 for channelling a second cooling medium through the platform 24 to a second plurality of outlet cooling holes 72 provided on the upper surface 30 of the platform 24, for cooling the platform. According to the embodiment in FIG. 1, at least a first inlet opening 65 and a second inlet opening 66 of the channel 62 are provided on platform 24, at the lower surface 31, respectively adjacent to the leading border 41 and adjacent to the trailing border 43 of the platform 24.

More in general, according to the present invention, one opening may be enough, provided that it is designed for receiving in operation the second cooling medium from the inner cavities 16 of the rotor 15.

To this purpose, with reference to the embodiment in FIG. 1, the openings 65, 66 of the channel 62 are oriented radially towards the rotation axis X and the root 22.

The openings 65, 66 are provided on the lower surface 31, respectively between the leading border 41 and the upstream seat 93 and between the downstream seat 94 and the trailing border 43.

The second cooling medium is a leakage gas flowing in the inner cavities 16 of the rotor 15.

The passage 62 is a part of a second cooling circuit (represented by arrows 60) distinct and separated from the first cooling circuit 50, for cooling the platform 24 independently from the first cooling circuit 50. The second cooling circuit 60 extends from the cavities 16 of the rotor 15, through the passage 62 up to the second plurality of outlet cooling holes 72.

In operation, the first cooling circuit is fed by air flowing through the root 22 of the blade 20, while the second circuit receives air entering the openings 65, 66 provided on the platform 24 at a distance from the rotation axis X which is greater than the distance between the opening 23 and the rotational axis X.

The second plurality of outlet cooling holes 72 may be on one and/or the other of two areas of the upper surface 30 of the platform 24, which are on opposite sides with respect to the aerofoil 26: —a first area comprised between the suction side 37 and the suction border 45 of the platform 24, —a second area comprised between the pressure side 39 and the pressure border 47 of the platform 24.

According to possible different embodiments of the present invention, the rotor blade 26 may comprises one single channel 62 from the opening 65 and/or the opening 66 to all outlet cooling holes 72, or a plurality of channels 62, for example one channel 62 from the inlet opening 65 to the portion of outlet cooling holes 72 on first area comprised between the suction side 37 and the suction border 45 and another channel 62 from the second inlet opening 66 to the portion of outlet cooling holes 72 on the second area comprised between the pressure side 39 and the pressure border 47.

In all embodiments, it is nevertheless essential that second cooling circuit 60 is separated from the first cooling circuit 50 and that the openings of the second cooling circuit 60 are designed in order to receive the second cooling circuit the second cooling medium from the inner cavity of the rotor.

This design allows the leakage gas flowing through the platform to be directed towards the pressure side or the suction side of the aerofoil, dividing the cooling effect between the two sides. The dimensions, relative distance and number of the according outlet cooling holes 72 are defined according to cooling necessities in the different embodiments according to the present invention.

With reference to the embodiments in FIGS. 1 to 4, the channel 62 comprises a plurality of fins 63, 64 for channelling the second cooling medium to the second plurality of outlet cooling holes 72.

In particular, with reference to the embodiment in FIG. 4, the channel 62 comprises a plurality of fins 63 subdividing the channel 62 into sub-channels from a bigger opening, with respect to openings 65, 66 of the embodiment in FIG. 1, to the outlet cooling holes 72.

Figure 5:
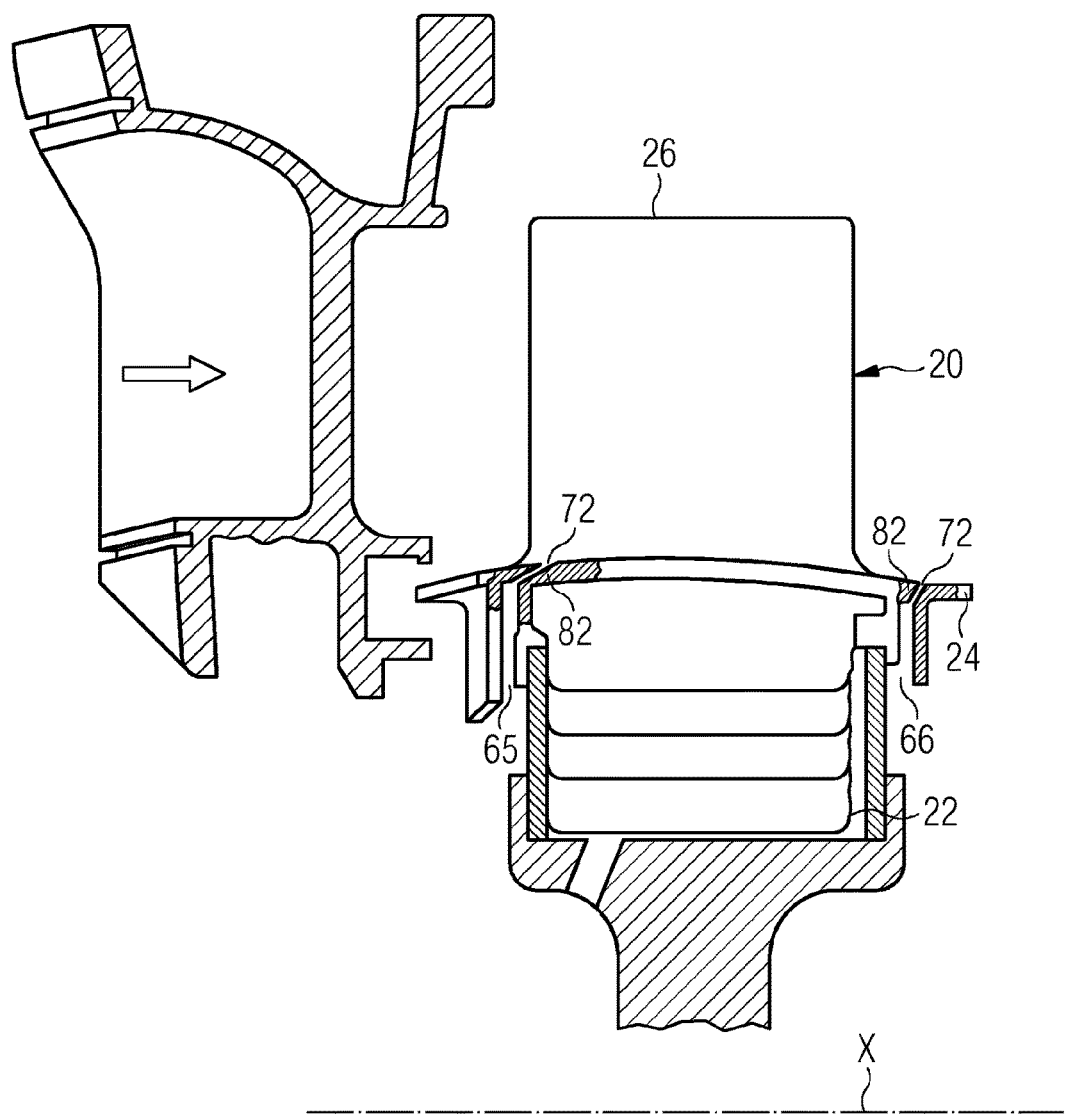
FIG. 5 is a partial longitudinal sectional view of a gas turbine according to the present invention, showing a further embodiment of a rotor blade according to the present invention.

The channels 62, 82 may be manufactured by casting, together with the rest of the blade 20 (embodiments in FIG. 1 to 4) or created by drilling after the casting of the blade 20 (embodiment in FIG. 5).

The outlet cooling holes 40 and 72 may be advantageously film cooling holes.

In the embodiments in FIG. 5, two drilled channels 82 are shown, which connect, respectively, from the openings 65, 66 to the upper surface 30 of the platform 24, by means, respectively of two outlet cooling holes 72. To obtain such embodiment of FIG. 5, first a pre-finished blade is obtained by casting. Such pre-finished blade includes the openings 65, 66, but no passage therefrom through the platform 24 to the upper surface 30. Then the channels 82 are drilled in the platform 24, thus obtaining the finished blade 20 of FIG. 5. In the embodiments in FIG. 5, two drilled channels 82 are cylindrical.

The invention claimed is:

1. A blade for a rotor of a gas turbine, comprising:
a root for connecting the blade to a disc of the rotor,
a platform comprising a lower surface from which the root extends and an upper surface opposite to the lower surface,
a hollow aerofoil extending from the upper surface of the platform,
the hollow aerofoil comprising a leading edge and a trailing edge and the platform comprising a leading border upstream the leading edge and a trailing border downstream the trailing edge, the lower surface of the platform comprising an upstream seat and a downstream seat,
an inner cooling passage inside the hollow aerofoil for channelling a first cooling medium to a first plurality of outlet cooling holes provided on at least an external surface of the hollow aerofoil, and
a channel, separated from the inner cooling passage, extending through the platform for channelling a second cooling medium from at least one opening of the channel to a second plurality of outlet cooling holes provided on the upper surface of the platform, wherein an inlet portion of the channel extends radially from the at least one opening, and wherein a flow area of the inlet portion decreases in a flow direction from the at least one opening toward the second plurality of outlet cooling holes,
wherein the at least one opening of the channel is provided on the lower surface of the platform between the leading border and the upstream seat and/or between the downstream seat and the trailing border, and
wherein the inlet portion of the channel comprises a plurality of fins that converge together as the flow area of the inlet portion decreases and that are configured to subdivide the channel into a plurality of subchannels.

2. The blade according to claim 1,
wherein the least one opening of the channel is oriented towards the root for receiving in operation the second cooling medium from an inner cavity of the rotor.

3. The blade according to claim 1,
wherein the channel comprises at least a first opening adjacent to the leading border and a second opening adjacent to the trailing border.

4. The blade according to claim 3,
wherein the first opening and the second opening are respectively provided between the leading border and the upstream seat and between the downstream seat and the trailing border.

5. The blade according to claim 1,
wherein the inner cooling passage inside the hollow aerofoil comprises an opening in the root.

6. A gas turbine comprising
a rotor, including at least:
a disc;
an inner cavity upstream or downstream to the disc; and
a blade, according to claim 1.

7. A gas turbine according to claim 6,
wherein the rotor is mounted in order to rotate around a rotation axis, the at least one opening of the channel being oriented towards the rotation axis in order to receive in operation the second cooling medium from the inner cavity of the rotor.

8. A gas turbine according to claim 6,
wherein the blade is mounted on the disc of the rotor,
a first cooling circuit comprising a second passage in the disc communicating with the inner cooling passage inside the hollow aerofoil for channelling the first cooling medium to the first plurality of outlet cooling holes.

9. A blade for a rotor of a gas turbine, comprising: a root configured to connect the blade to a disc of the rotor, a platform comprising a lower surface from which the root extends, an upper surface opposite to the lower surface, and a leading border and a trailing border relative to a flow direction of a working fluid flowing over the platform, wherein the lower surface of the platform comprises an upstream seat and a downstream seat relative to the flow direction, wherein the upstream seat and the downstream seat are each configured to connect a respective side plate, a hollow aerofoil extending from the upper surface of the platform and comprising an inner cooling passage configured to channel a first cooling medium to a first plurality of outlet cooling holes provided on an external surface of the hollow aerofoil, and a channel that is discrete from the inner cooling passage and which extends through the platform from a channel opening to a second plurality of outlet cooling holes provided on the upper surface of the platform, wherein a circumferential location of a center of a nearest of the leading border and the trailing border is disposed between circumferential ends of the channel opening, wherein an inlet portion of the channel extends radially from the opening, wherein a flow area of the inlet portion decreases in a downstream direction from the opening toward the second plurality of outlet cooling holes, wherein the channel opening is provided on the lower surface of the platform between the leading border and the upstream seat and/or between the downstream seat and the trailing border, wherein the inlet portion of the channel further comprising a plurality of fins that converge together as the flow area of the inlet portion decreases and that are configured to divide the channel into plural subchannels.

10. The blade according to claim 9, wherein the channel opening is provided between the leading border and the upstream seat, wherein the second plurality of outlet cooling holes are disposed on a pressure side of the hollow aerofoil upstream of a trailing edge of the hollow aerofoil, and wherein the flow area of the inlet portion decreases so the channel can pass between a leading edge of the hollow aerofoil and a side of the platform before reaching the second plurality of outlet cooling holes.

* * * * *